United States Patent

[11] 3,561,785

| [72] | Inventor | Charles C. Kidder<br>Rte. 1 Box 735, Crannell, Calif. 95530 |
|---|---|---|
| [21] | Appl. No. | 804,599 |
| [22] | Filed | Mar. 5, 1969 |
| [45] | Patented | Feb. 9, 1971 |

[54] PROTECTIVE COVER FOR VEHICLES
3 Claims, 4 Drawing Figs.

[52] U.S. Cl............................................. 280/150;
296/102
[51] Int. Cl.................................................. B62d 25/06
[50] Field of Search............................................ 280/150
(C), 150 (F); 296/28 (.7), 102

[56] References Cited
UNITED STATES PATENTS

| 1,473,956 | 11/1923 | Eyre et al................ | 280/150(X) |
| 2,263,978 | 11/1941 | Branovic et al.......... | 280/150(X) |
| 2,441,132 | 5/1948 | Blakey...................... | 280/150(X) |
| 2,783,056 | 2/1957 | Belk........................... | 280/150 |
| 2,805,887 | 9/1957 | Selby......................... | 296/102 |
| 2,828,970 | 4/1958 | Ivey........................... | 280/150 |
| 2,921,799 | 1/1960 | Hatten....................... | 280/150 |
| 3,203,728 | 8/1965 | Wood......................... | 296/102 |

FOREIGN PATENTS

| 622,899 | 3/1927 | France....................... | 280/150 |
| 511,518 | 8/1939 | Great Britain............. | 296/28(.7) |

*Primary Examiner*—Leo Friaglia
*Assistant Examiner*—Leslie J. Paperner
*Attorney*—Townsend and Townsend

ABSTRACT: A protective cover for placement over the driver's seat of a vehicle and defined by a plurality of arcuate members secured to the vehicle. The members define oval shaped, arcuate roll surfaces extending over an arc of more than 180° so that objects striking the canopy slidably move along the roll surfaces under their own weight and off the canopy and the vehicle without contacting the operator of the vehicle.

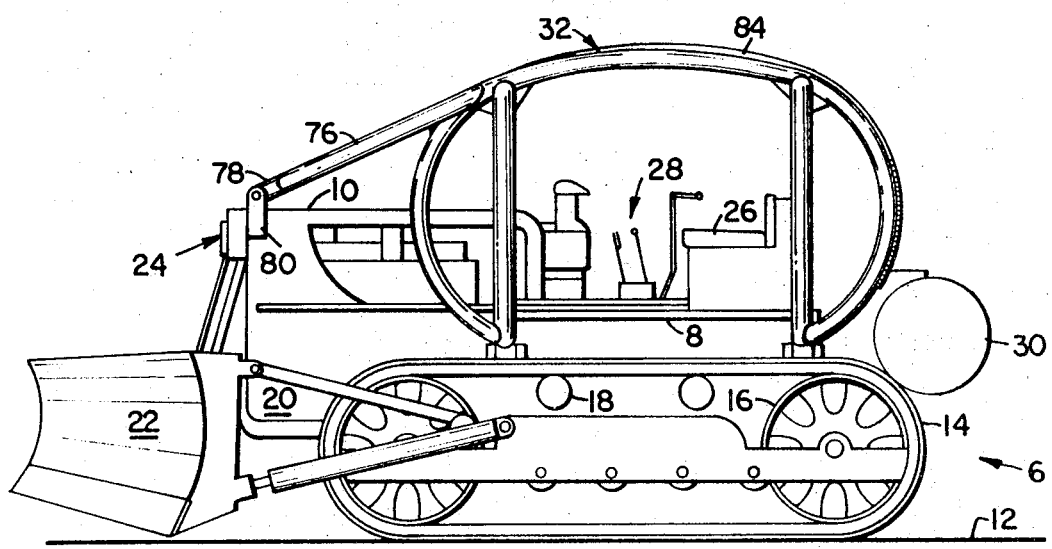
FIG_1
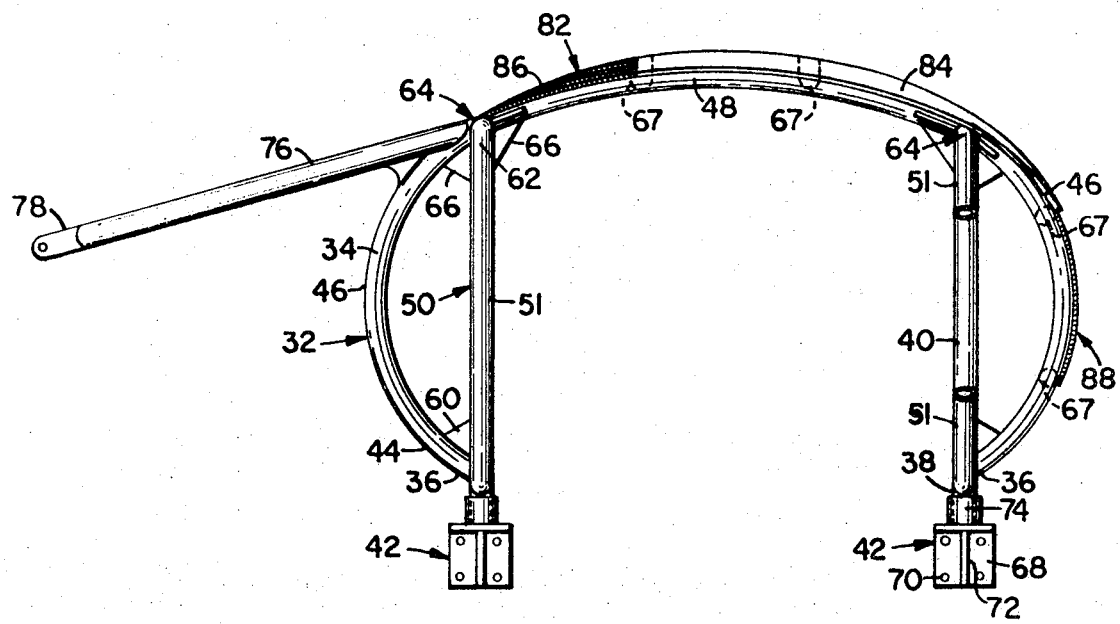
FIG_2
INVENTOR.
CHARLES C. KIDDER
BY
Townsend and Townsend
ATTORNEYS PATENTED FEB 9 1971
3,561,785
SHEET 2 OF 2
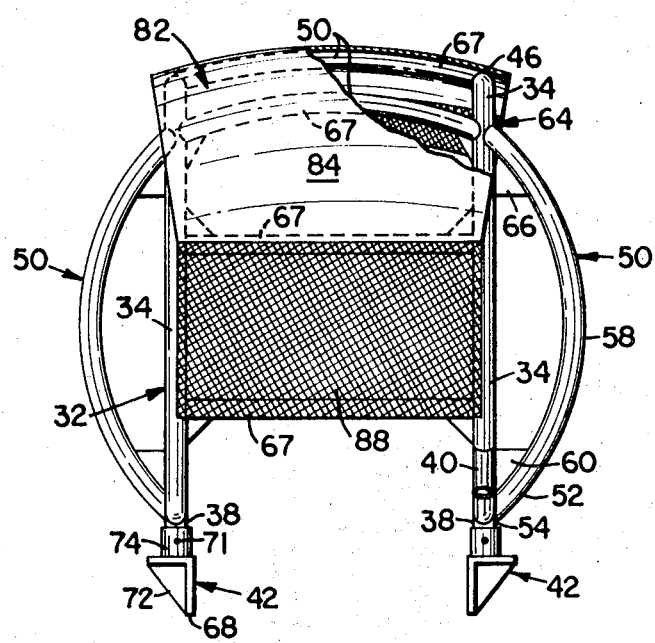
FIG_3
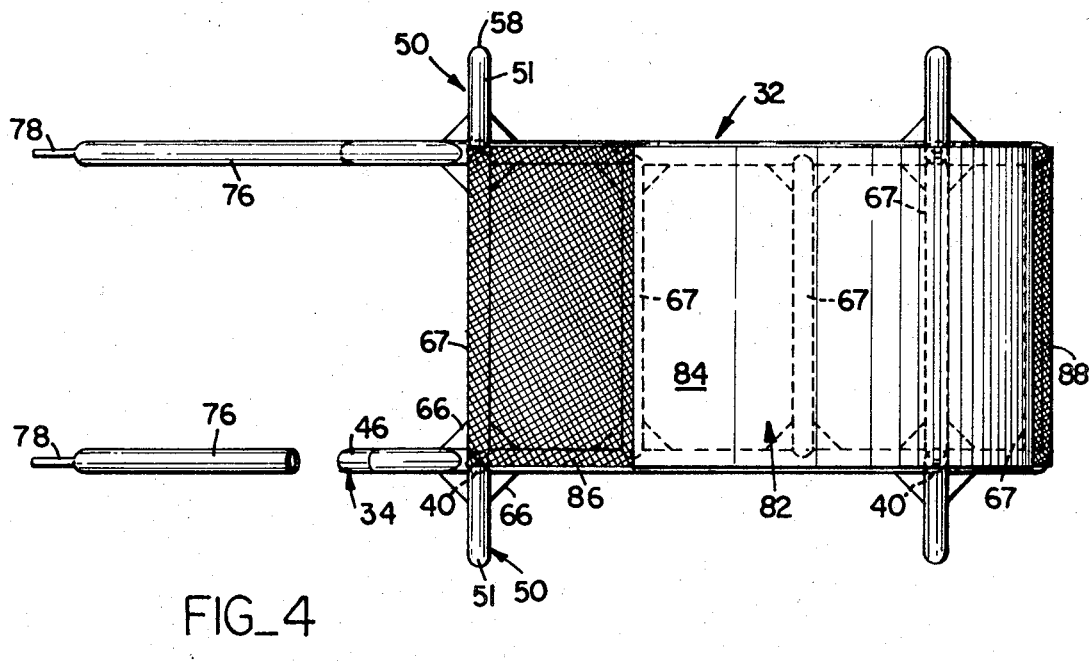
FIG_4
*INVENTOR.*
CHARLES C. KIDDER
BY
*Townsend and Townsend*
ATTORNEYS

3,561,785

PROTECTIVE COVER FOR VEHICLES

BACKGROUND OF THE INVENTION

This invention relates to protective covers for vehicles and more particularly to such covers constructed to have an oval or egg-shaped outer surface configuration to increase its structural strength and cause the deflection therefrom of objects striking it.

Vehicles, particularly heavy, earth-moving construction vehicles such as crawler tractors, bulldozers, crawler-type loaders, etc., are in constant danger from being struck by falling objects such as telegraph poles, trees, portions of buildings, etc. In addition, the uneven terrain on which they frequently operate can cause the vehicles to turn over. These represent grave dangers to the operator of the vehicle. To give the operator at least some protection guards have in the past been constructed over and around the driver's seat. Such guards are most effective in protecting the driver when struck by relatively light objects. Heavy objects, such as large diameter trees or the forces acting on the guard if the vehicle rolls over have so far been generally greater than the strength that could be built into such guards.

In the past the strengthening of the guard has been inhibited by the fact that the vehicle operator requires ready access to the driver's seat and that he must be in a position to fully view the surroundings so that workmen are not endangered. Exemplary of a prior art guard construction is U. S. Pat. No. 2,921,799 which provides a partially arcuate frame that is unsupported over more than 180° and carries a sun and rain cover for the convenience of the operator. U.S. Pat. No. 2,441,132 discloses another approach in which a cagelike structure of a semiarcuate construction fully encloses the upper portion of the vehicle. Although both of these constructions afford some protection to the vehicle operator neither one is capable of overcoming the aforementioned deficiencies. The mere use of heavier cross section structural members for the covers would prohibitively increase the weight and cost of the cover, would materially decrease the visibility afforded the driver and would in many instances still be insufficient for a proper protection of the driver from heavy, falling objects or from being crushed by the overturned vehicle.

SUMMARY OF THE INVENTION

The present invention provides a cover of a high structural strength which is formed so as to deflect striking objects. Briefly, the cover comprises a structure defined by arcuate, elongate cover members defining a plurality of arcuate, exterior roll surfaces. The roll surfaces spread outwardly from adjacent the vehicle frame, extend away from the frame and are joined at intermediate points to form continuous, oval roll surfaces disposed in a plurality of planes. Mounting means are further provided to secure the members to the vehicle frame.

In the preferred embodiment of this invention a screen is positioned intermediate at least some of the roll surfaces to prevent the penetration of relatively small objects into the space below the cover. The screen is constructed to permit the driver to view the surroundings of the vehicle therethrough.

The roll surfaces of the canopy slope downwardly from an uppermost point of each roll surface in opposing directions over an arc of more than 90°. Consequently, each roll surface defining cover member and the canopy as a whole have an egg-shaped or oval configuration to impart maximum strength, approaching that of a spherical structure, to the canopy for given size cover members. Heavy objects, such as a large diameter tree, which would crush prior art canopies constructed of the same cross section cover members as the canopy of the present invention are deflected and guided downwardly and away from the driver beneath the canopy to thereby protect the operator from serious injuries. The egg-shaped configuration of the roll surfaces and the arc of more than 180° prescribed by them assure that a striking object glances off the canopy, even if it strikes the canopy in a horizontal plane.

Aside from the stated advantages provided by the present invention the egg-shaped configuration of the canopy lets a rolling vehicle continue its motion from its inverted towards its upright position. This lessens the danger to the operator, who may be strapped into his seat and be unable to safely free himself while the vehicle is in an overturned position. Furthermore, this feature can prevent the need for special hoisting equipment to place the vehicle back into its upright position after it has rolled over.

BRIEF DESCRIPTION OF THE DRAWINGS

Other objects, features, and advantages of the present invention will be more apparent after referring to the following specification and attached drawings in which:

FIG. 1 is a side elevational view of a crawler-type earth-moving vehicle having a protective canopy constructed according to the present invention;

FIG. 2 is an enlarged side elevational view of the canopy;

FIG. 3 is an end view of the canopy shown in FIG. 2; and

FIG. 4 is a plan view of the canopy shown in FIG. 2.

DESCRIPTION OF THE PREFERRED EMBODIMENTS

Referring first to FIG. 1, a crawler-type tractor or vehicle 6 comprises a platform 8 on which a power plant 10 is mounted. A pair of endless tracks 14 looped over spaced-apart drive wheels 16 and carried by rollers 18 supports the vehicle on ground 12. A forward end 20 of the tractor pivotally mounts a working device such as a scraper blade 22 and includes means 24 for raising and lowering the blade. A driver's seat 26 is mounted to the platform rearwardly of power plant 10 and controls 28 are provided to permit the operation of the tractor. The tractor may further include an exteriorly mounted fuel tank 30 secured to the rear end of the tractor in a conventional and well-known manner.

Such vehicles are commonly employed around construction sites for highways, buildings, dams, etc. and are, therefore, subject to rough handling. In addition, at such construction sites it is not infrequent that objects, such as trees, telegraph poles, beams, etc. accidentally fall. This exposes the driver to the danger of being hit by such objects and suffering personal injuries of the most serious character. To shield and protect the driver the present invention provides a protective cover or canopy 32 which is secured to vehicle platform 8 and encloses the vehicle operator.

Referring to FIGS. 2—4, the canopy comprises a pair of parallel, spaced-apart frame members 34 disposed in vertical planes and straddling the longitudinal axis of the tractor. The frame members are egg-shaped, that is they are continuously arcuate over their full length between ends 36 of the members. The ends are secured to lower ends 38 of upright posts 40 which are mounted to vehicle platform 8 by brackets 42. Longitudinal frame members 34 extend over an arc greater than 180° so that portions 44 of the members adjacent upright post 40 spread outwardly from adjacent platform 8. Consequently, each frame member defines an outwardly facing roll surface 46 which extends from an uppermost point 48 of each member downwardly towards vehicle platform 8 in a continuously arcuate manner.

A pair of second or transverse frame members 50 lie in upright planes defined by posts 40 and are substantially perpendicular to longitudinal frame members 34. The transverse frame members are defined by a pair of continuously arcuate sections 51 extending from adjacent the lower end of post 40 to adjacent upper end 62 of the posts and by arcuate stiffeners 67 intermediate the upper portion of longitudinal frame members 34.

Ends 36 and 54 of frame members 34 and 50 are secured to upright posts 40 adjacent their lower ends 38 in a conventional manner as by welding. Gusset plates 60 are provided to strengthen and rigidify the joint. The intersection of the longitudinal frame members 34, sections 51, stiffeners 67 and upper ends 62 of upright posts 40 forms a joint 64, preferably welded, which is also reinforced by four triangular gusset plates 66, best illustrated in FIG. 4. Thus, the upright posts provide powerful supports for the frame members against being crushed by forces acting transversely to the vehicle platform.

Brackets 42 securing the canopy to platform 8 are defined by an angle iron 68 provided with a plurality of mounting holes 70 and strengthened by a transverse web 72 welded between the legs of the angle iron. A tubular sleeve or post 74 projects from the upwardly facing surface of the horizontal angle iron leg and slidably receives lower end 38 of upright post 40. Means, such as set screws 71 are provided to secure the lower end of the upright posts to the sleeve and the mounting brackets. The mounting brackets are bolted to a vertical member of the vehicle platform so that the driver's seat is completely enclosed within canopy 32.

Dimensionally, the canopy is constructed so that it provides the vehicle operator with sufficient space in all directions to operate the vehicle and manipulate the controls without projecting any portion of himself beyond the canopy boundaries. Consequently, the uppermost points of the frame members are spaced from the platform so that they are well above the head of the operator.

The canopy is further constructed so that it has sufficient structural strength to withstand the greatest expected forces. Normally, the greatest forces to which the canopy may be exposed are encountered when the vehicle rolls over, either sideways or end-over-end. In such a case, the full weight of the vehicle which, under normal circumstances, almost always exceeds 10 tons acts as a compressive force on the canopy. Crushing of the canopy in that position results in the almost certain death for the vehicle operator who may be strapped into driver's seat 26. The arrangement of frame members 34, 50, particularly their arcuate shape and their strengthening at intermediate points by upright posts 40 permits the construction of the canopy of relatively lightweight materials while providing it with sufficient strength to easily withstand forces equal or greater to the vehicle weight without buckling or crushing Applicant has determined that the canopy described in the preceding paragraphs can withstand forces that may be a multiple of the earlier referred to 10-ton vehicle weight, such as a weight of about 30 tons if the frame members and upright posts are constructed of 3-inch diameter double extra heavy pipe. Protective covers of equal strength constructed according to the prior art, if available at all, had to employ a prohibitive amount of expensive materials.

Referring to FIGS. 1—4, the canopy of the present invention protects the forward portion of tractor 6, and particularly power plant 10, from damage through falling objects by providing a shield defined by forwardly extending and downwardly sloping arms 76. The arms are joined to longitudinal frame members 34 immediately forward and downward of joint 64 as by welding the arms thereto. At their free ends the arms include a mounting lug 78 for connection to an upwardly extending bar 80 secured to power plant 10. In this manner, arms 76 effectively protect the forward portion of the tractor and the power plant from heavy falling objects.

If the vehicle is provided with an exterior fuel tank 30 as illustrated in FIG. 1, arms (not separately shown) similar in construction to arms 76 may be secured to the longitudinal frame members 34 and depend from adjacent the rear end of the vehicle over the tank. Suitable bracket means, similar to bar 80 extending from power plant 10, are provided to connect the free ends of the arms extending over the tank with the vehicle. Protection of the tank from falling objects is thereby obtained and the danger of such objects rupturing, and/or breaking the tank off its mountings is eliminated.

If during the operation of tractor 6 a heavy object, say a tree (not shown) falls towards driver's seat 26 the vehicle operator is securely protected by canopy 32. Assuming that the tree falls in a vertical direction, as soon as it strikes the roll surfaces 46, 58 of frames 34, 50, a component force between the tree and the canopy develops which tends to glance the tree off the canopy along the roll surfaces. In addition, the deflection of the falling tree obtained from the curvature of the canopy causes a reduction of the force acting on the frame members. This, coupled with the increased strength obtained from the rigidity of the frame results in the earlier discussed high strength of the canopy coupled with relatively low weight.

Similarly to the deflection effect provided by the canopy against falling objects, should the vehicle roll, to its side or end-over-end, the curved or arcuate roll surfaces of the frame members let the vehicle continue its rolling motion. Since the center of gravity of the vehicle is somewhere below the upper surface of vehicle platform 8, and the canopy forms a continuous roll surface, the vehicle is unstable as long as it rests on the canopy and has, therefore, a tendency to right itself. This is highly desirable for the operator, who is usually strapped into his seat, may be unable to free himself as long as the vehicle is in its inverted position. Moreover, the need for special hoisting equipment to right the fallen vehicle is thereby often eliminated.

Although the canopy as described in the preceding paragraphs provides protection for the operator from relatively large objects, smaller objects such as falling rocks, bricks, bolts and nuts, frequently encountered around construction sites, can intrude into the space below the canopy from between the frame members. To eliminate danger to the operator from small falling objects a screen 82 is secured to the frame members, particularly that portion of the frame members lying overhead of the driver's seat. Immediately above the seat, where the operator does not need visibility, it is preferred to install a relatively heavy steel plate 84 secured to the adjacent frame members of the canopy. The steel plate is preferably placed over the exterior of frame members 34, 50 as best illustrated in FIGS. 3 and 4, and thus defines a portion of the roll surfaces of the frame members.

Further forward and rearward of the driver's seat visibility is required for the safe operation of the vehicle. The forward and rearward most portions 86, 88 of screen 82 are therefore formed of a material, such as wire mesh, expanded metal, or transparent plastic, permitting the operator to view therethrough while providing sufficient strength to deflect the lighter objects falling thereon. The wire mesh may be extended to cover a greater portion of the canopy if the particular surroundings in which the vehicle operates so require.

While one embodiment of the invention has been shown and described, it will be obvious that other adaptations and modifications can be made without departing from the true spirit and scope of the invention.

I claim:

1. A protective canopy for use in conjunction with vehicles having a platform, means for supporting and propelling the vehicle, and a control station on the platform for use by an operator of the vehicle, the canopy comprising:
   a pair of spaced-apart, first frame members disposed in parallel planes, each first frame member having a continuously arcuate configuration and extending over an arc of more than 180°;
   a pair of spaced-apart second frame members disposed substantially perpendicularly to the first frame members, the second frame members having a continuously arcuate configuration and extending over an arc of more than 180°;
   joint means interconnecting the first and second frame members at points intermediate ends thereof, the joint means being positioned so that portions of the members between said points and the ends of the members extend steeply downwardly from said points;
   rigid posts depending vertically downward from said points and terminating in lower ends;
   means connecting ends of the first and second members to the posts adjacent the lower ends, whereby each post and the member portions connected thereto form rigid, high strength upright supports interconnected by remaining portions of the members for withstanding forces of a magnitude equal to the vehicle weight without substantial deformation; and mounting means connected to the post ends for directly securing the upright supports to the vehicle platform.

2. Apparatus according to claim 1 including a protective screen secured to and disposed intermediate the members, a portion of the protective screen being constructed to define a universally curved convex roll surface and a portion of the protective screen further permitting the vehicle operator to view therethrough.

3. A heavy construction vehicle comprising:

a vehicle frame;

means mounted to the frame supporting the frame on and propelling it along the ground;

work devices mounted to the frame;

a driver seat mounted to the frame for use by an operator of the vehicle, the driver's seat being positioned so that at least a portion of the operator is above the vehicle frame;

and a protective canopy secured to the vehicle, enclosing the driver's seat and extending upwardly of the frame so that the vehicle driver is positioned below an uppermost portion of the canopy, the canopy defining arcuate roll surfaces of a generally oval configuration extending from an uppermost point of each such roll surface downwardly in opposite directions towards the vehicle frame over an arc of more than 90°, the canopy being constructed of a plurality of sets of parallel tubular members disposed in substantially vertical planes, the members of one set being positioned in planes that are transverse to planes in which members of another set are disposed, and upright posts secured to the members and the frame at spaced-apart locations to provide the members with sufficient strength to withstand a load acting substantially perpendicularly to the platform which is at least as great as the weight of the vehicle so that the canopy withstands the full weight of the vehicle while in an inverted and unstable position without being crushed, the arcuate roll surfaces promoting the inverted, unstable vehicle to roll on the roll surfaces towards its upright, stable position.